(No Model.)  2 Sheets—Sheet 1.

E. HAY.
HYDRAULIC MOTOR.

No. 358,777. Patented Mar. 1, 1887.

Witnesses:
Phil C. Dietrich
A. E. Sowell

Inventor:
Ellwood Hay
by
T. H. Alexander
Atty.

(No Model.)

E. HAY.
HYDRAULIC MOTOR.

No. 358,777. Patented Mar. 1, 1887.

Witnesses:
Phil C. Dietrich
A. E. Dowell

Inventor:
Ellwood Hay.
by:
J. H. Alexander
Atty.

UNITED STATES PATENT OFFICE.

ELLWOOD HAY, OF EASTON, PENNSYLVANIA, ASSIGNOR TO HIMSELF AND HERBERT F. SEIP, OF SAME PLACE.

HYDRAULIC MOTOR.

SPECIFICATION forming part of Letters Patent No. 358,777, dated March 1, 1887.

Application filed November 5, 1886. Serial No. 218,115. (No model.)

*To all whom it may concern:*

Be it known that I, ELLWOOD HAY, of Easton, in the county of Northampton and State of Pennsylvania, have invented certain new and useful Improvements in Hydraulic Motors; and I do hereby declare that the following is a full, clear, and exact description thereof, reference being had to the accompanying drawings, and to the letters of reference marked thereon, which form part of this specification, in which—

Figure 1:
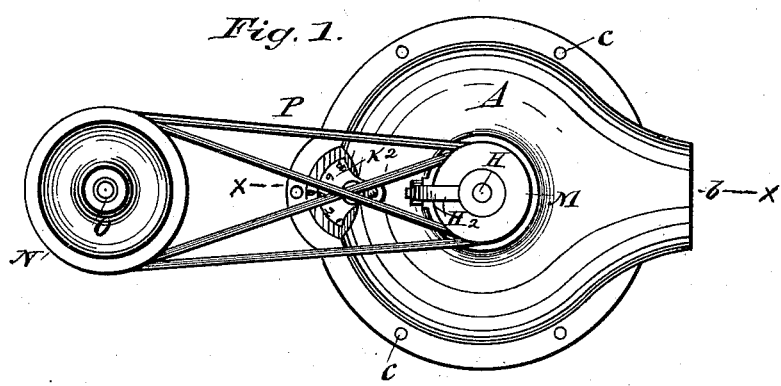
Figure 2:
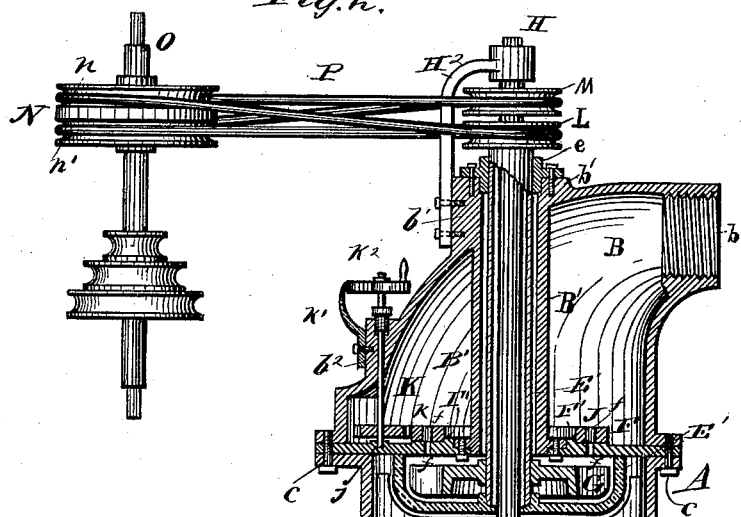
Figure 3:
Figure 4:
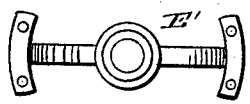
Figure 8:
Figure 5:
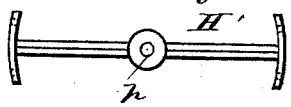
Figure 9:
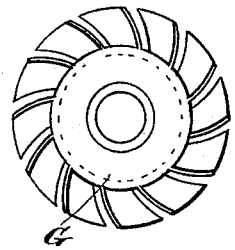
Figure 6:
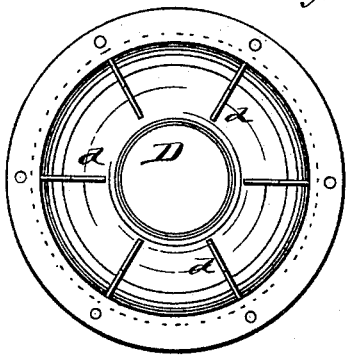
Figure 10:
Figure 7:
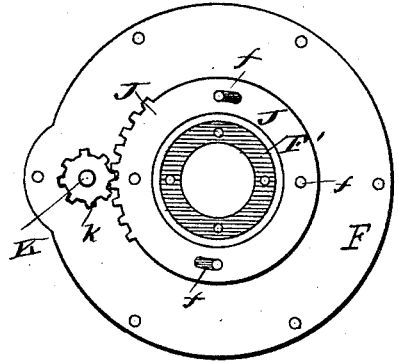
Figure 11:
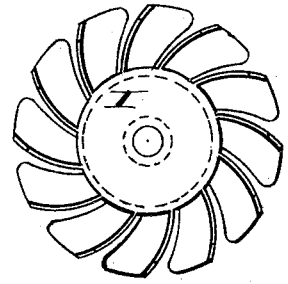

Figure 1 is a top plan view of my improved hydraulic motor in its casing as ready for use. Fig. 2 is a central vertical section through the turbines and casing on line $x\ x$, Fig. 1, showing the inlet and outlet openings for the water. Fig. 3 is a detail view of the supporting-bracket for the upper end of the lower turbine-shaft, showing the pulleys on the ends of the turbine-shafts in sections. Fig. 4 represents the supporting-step for the lower end of the upper wheel-shaft. Fig. 5 shows the step or bearing for the shaft of the lower wheel or turbine. Fig. 6 is a plan view of the lower discharge portion of the motor-casing. Fig. 7 is a plan view of the diaphragm or partition of the casing with its gate or valve. Figs. 8 and 9 represent a side and a plan view of the upper turbine, and Figs. 10 and 11 represent similar views of the lower turbine.

This invention relates to improvements in hydraulic motors, having especial reference to that class in which two turbines or water-wheels having concentric shafts are used—one turbine above the other—so that the water, after actuating the upper turbine, will be utilized to work the lower turbine in a reverse direction to the upper.

The invention has for its objects to so construct the motor that while the turbines shall receive the full working force and pressure of the water upon their blades they will be relieved from the pressure of a standing column of water upon their hubs, thus preventing the friction and wear upon the lower journals of the turbine-shafts, as is the case in the ordinary constructions of such motors, in which the whole weight of the actuating column of water is supported by the turbine itself when in operation.

Further objects of the invention are to regulate the supply of water to the turbines independently of the supply to the motor-casing, to cause the water after passing the turbines to leave the casing rapidly, and to so connect the two pulleys on the respective shafts of the turbines with the pulley on the driving-shaft of a mill that the full power of each turbine will be utilized to rotate said driving-shaft in one direction. These objects I attain by the herein-described motor, which consists in the novel construction and arrangement of parts hereinafter described and claimed, and illustrated in the accompanying drawings, to which reference is had by letters.

A designates the casing of the motor, which is made of metal, and preferably cast in three parts, B, C, and D, B being the upper or receiving portion of the casing; C, the central portion, forming the turbine-chamber, and D the lower exit-chamber of the casing.

The casing is, in general form, shaped like a "converter," the upper portion, B, having its top rounded and converging to one side, forming the inlet-opening $b$, which may be screw-threaded to receive the threaded end of a delivery-pipe from a main or other water supply; or the opening may be flanged and bolted to the delivery-pipe, or secured thereto in any suitable manner. The lower portion of part B is cylindrical and flanged on its outer surface to correspond with a flange on the upper portion of part C, so that the two parts may be bolted together, as hereinafter described.

B' designates a vertical tube or pipe, depending centrally in the part B, with which it may be cast entire, as shown, or made separate and bolted to the top wall thereof, as may be found desirable. The lower end of tube B' is provided with an outwardly-standing flange, for a purpose hereinafter shown. On the outside of part B, surrounding the upper mouth of tube B', is formed a bearing, $b'$, to which is secured a journal-box, $e$, of the outer vertical shaft of the upper turbine, G.

F designates a diaphragm or partition-plate, which is interposed between the parts B and C, and rigidly secured in place by bolts $c$, which pass through openings in the outer edge of the diaphragm and in the adjoining flanges of parts B C, as shown in Fig. 2. The central portion of partition F has an annular opening corresponding with the opening in the lower end of tube B', and its inner periphery is bolted to the flange on the lower end of the tube, forming a water-tight joint therewith. The partition F thus separates the interior of part B from part C, and forms a water-receiving chamber in the former part.

E designates the hollow shaft of the upper turbine, passing up through tube B' in part B, and having its upper end journaled in box $e$ on bearing $b'$ of part B, as described. The shaft E is of such size and the journal-box $e$ so arranged, as shown, that the shaft does not impinge at any point against the inner surface of tube B', and consequently encounters no friction therefrom. The lower end of shaft E is supported and journaled in a step, E', so that it can rotate freely and easily thereon. This step E' is shown in Figs. 2 and 4, and is of a U shape, the upper ends of the step being formed with cross-heads and provided with suitable openings, as shown, by which the step is bolted rigidly to the lower surface of partition F. The bearing of the shaft E on this step is formed with an annular opening corresponding in diameter to the inner diameter of the hollow shaft E.

G designates the upper turbine, which is keyed on the shaft E, below partition F. The turbine G rotates within the step E', being of less diameter than the length of the latter, and the step being of less diameter than the inside of part C, as shown.

Figs. 8 and 9 represent the form of upper turbine, G, which I prefer using, though other styles of turbine may be used, if desired.

H designates the shaft of the lower turbine, running vertically and centrally through the shaft E, but not impinging against the latter. The upper end of this shaft is journaled in the enlarged head of a bayonet-bracket, $H^2$, the lower arm of which is bolted to the portion $b'$ of part B, as shown. The lower end of shaft H is balanced and turns upon the point of an adjusting-screw, $h$, which passes through and engages a threaded opening in the central boss of cross-piece H', the opposite ends of which are provided with suitable heads and bolted to diametrically-opposite lower portions of the central part, C, of the casing. By means of the journal-screw $h$ the turbines can have their positions adjusted in regard to each other.

I designates the lower turbine, which is of sufficient diameter to entirely occupy, but move freely within, the turbine-chamber in part C, and which is keyed on the shaft H, so that its upper surface just clears the lower surface of step E'. The turbine I is preferably made of the form shown in Figs. 10 and 11, with its blades inclining in opposite directions to the blades of wheel G, so that the turbines will rotate in different directions when in operation. The outer edges of the blades of the turbine I are extended upwardly, as shown, so that when in position their upper edges are or may be below or about flush with the upper edges of the blades of wheel G, the screw-bearing $h$ of the shaft H permitting the shaft, and consequently the turbine I, to be raised or lowered, and thus vary the relative adjustments of the turbines until the desired results in operation of the same are attained by the best disposition of the water thereon.

The lower part, D, of the casing is cone-shaped, its upper end being similar in size to the part C, and having a suitable outstanding flange, by which part D is bolted to a similar flange on the lower portion of part C. From the flange the sides of part D converge inward until only a sufficient opening is left to permit free exit of the water after it has passed through the turbines, the water escaping thence to any suitable point of discharge.

To prevent rotation of water in part D, and consequently retardation of the turbines, I provide or cast on the interior of part D a series of vertical plates or wings, $d$, as shown, which effectually stop the rotation of the water acquired in its passage through the turbines, and direct it out of the casing.

When the motor is to be used on a natural water-course, the part D may be dispensed with, as the water can then be allowed to escape direct from part C into its natural channel or conduit; but in confined places—such as factories in cities, or where the motor may be used in running light machinery—the part D is highly beneficial in directing and causing the rapid discharge of water through the exit-pipes.

The manner of admitting water to the turbines is as follows: The partition F is provided with a series of concentric openings or ports, $f$, so made as to be directly over the blades of turbine G when the parts are in the position described. In the present instance there are four openings or ports to admit water from the receiving-chamber in part B into the turbine-chamber in part C. These ports are adapted to be closed by a ring-valve, J, which is seated by its inner periphery against a flange, F', situated just outside of the joining of the partition to tube B', as shown in Fig. 2. The valve is kept from moving vertically by the pressure of the water in the receiving-chamber thereon. The openings in partition F are preferably round, as shown, or made on portions of the same concentric arc, and the openings in ring J correspond in number to the ports $f$. Two of the openings in ring J, however, are in this instance made double size, as shown in Fig. 7, so that by properly turning valve J either two or four ports, $f$, will be opened, as is obvious, since the double-sized openings in valve J would uncover two ports $f$ before the others were opened as the valve is continued to be revolved.

The valve is operated by means of a pinion, $k$, keyed on the lower end of a shaft, K, situated in an offset of the casing, as shown, the pinion engaging against a series of teeth on the outer edge of the valve J, as shown in Fig. 7. The shaft K is journaled at its lower end in a bearing, $j$, formed on the upper surface of partition F, and its upper end is journaled in a bearing, $b^2$, formed on the part B, opposite the inlet $b$. The shaft K passes through a suitable stuffing-box made in part B, to prevent escape of water from the casing, and the upper end of the shaft is provided with a horizontal handle and index-plate, $k^2$, bearing numbers corresponding to the number of ports in partition F. $k'$ is an indicating-finger for the index-plate of shaft K, secured to the bearing $b^2$ of the shaft, as shown in Fig. 2. By means of the index-plate the person in charge of the motor can regulate the number of ports opened in partition F, and consequently the velocity or power of the turbines. It is obvious that the number of ports in the valve and partition may be varied. If desired, the port-openings in valve and partition may correspond, and the index made so that all the valves may be opened or closed, either partially or wholly, simultaneously. The first-described construction I prefer.

L designates a grooved pulley keyed on the upper end of shaft E, outside its journal $e$; and M designates a similar pulley keyed on the shaft H, outside of shaft E, above pulley L, but below the journal of shaft H in bracket $H^2$, the arm of which bracket has sufficient bend to permit free rotation of the pulleys, as shown in Fig. 2.

O designates the main shaft of the mill or factory to be run by the motor. The shaft may be either vertical or horizontal, and has upon it a pulley, N, situated in a horizontal line with the pulleys M L, and having two grooves, $n$ $n'$, respectively.

P designates a belt or rope passing from pulley M on shaft H, over pulley N in groove $n$, thence to pulley L on shaft E, around same back to and around pulley N in groove $n'$, and thence back to pulley M, whence it started. The belt being continuous, it is obvious that by the described arrangement of the belt the pulleys M L, though rotated in opposite directions by their turbines, will impart but one motion to shaft O through pulley N, and that thus the force or power of both turbines is utilized on the one main driving-shaft.

It is obvious from the foregoing description that the weight of the water is supported by the partition F, instead of by the journals of the turbines, and at the same time the latter are acted upon by the full pressure of the water in passing through ports $f$; also, that the water, after it has expended its primary force upon the smaller turbine, G, is utilized to act against the larger turbine, I, which, as it has much more bearing-surface or blade-surface, will obtain nearly if not the same rate of speed, and yield an equal amount of power to the turbine G. I thus use in my motor a principle analogous to that employed in duplex high and low pressure steam-engines with similarly good results.

Having described my invention, what I claim and desire to secure by Letters Patent is—

1. In a hydraulic motor, the combination of the casing provided with a water-inlet at its upper end and a water-exit at its lower end, the diaphragm F, secured transversely across said casing at a proper point and provided with the perforations or ports $f$, equally distant from its center, the vertical tube B', depending from the casing and having its lower end secured to the center of the diaphragm, the hollow shaft E within said tube B', journaled above in a bearing secured to the casing and below in a bearing secured to a transverse bracket or bar secured within the casing, the turbine wheel secured upon and rotating with the hollow shaft, the solid shaft within the hollow shaft supported below and turning upon the point of an adjusting-screw engaged in a central threaded opening in a transverse bracket secured within the casing, and the turbine wheel on the lower end of said shaft having its blades oppositely inclined to those on the turbine wheel on the hollow shaft, so as to be rotated in a direction opposite to that in which the wheel on the hollow shaft turns by the water descending therefrom, substantially as specified.

2. In a hydrulic motor, the combination of the casing A, composed of the parts B, C, and D, constructed and united as described, the tube B', depending centrally from the part B, the diaphragm F, provided with the perforations or ports $f$, and secured between the parts B C and to the lower end of tube B', as described, the toothed ring-valve J, provided with ports to register with those of diaphragm F, and seated on said diaphragm, as described, a vertical rod, K, inside the casing, journaled in the part B and diaphragm F, and having a cog, $k$, to engage the teeth of valve J and operate the same, the segment $K^2$, provided with an arm for turning the rod, and with an index-scale, and the pointer $k'$, whereby the opening of the valve can be regulated, the hollow shaft E and turbine G thereon, the shaft H and turbine I thereon below turbine G, the turbines being below diaphragm F and arranged to rotate in opposite directions, and suitable pulleys on the upper ends of the turbines, all constructed and adapted to operate substantially as described.

In testimony that I claim the foregoing as my own I affix my signature in presence of two witnesses.

ELLWOOD HAY.

Witnesses:
C. B. HETRICH,
JOHN S. NOBLE.